June 12, 1956  H. N. GIBSON  2,750,489
PHOTOGRAPHIC ILLUMINATING DEVICE
Filed Dec. 18, 1952  5 Sheets—Sheet 3
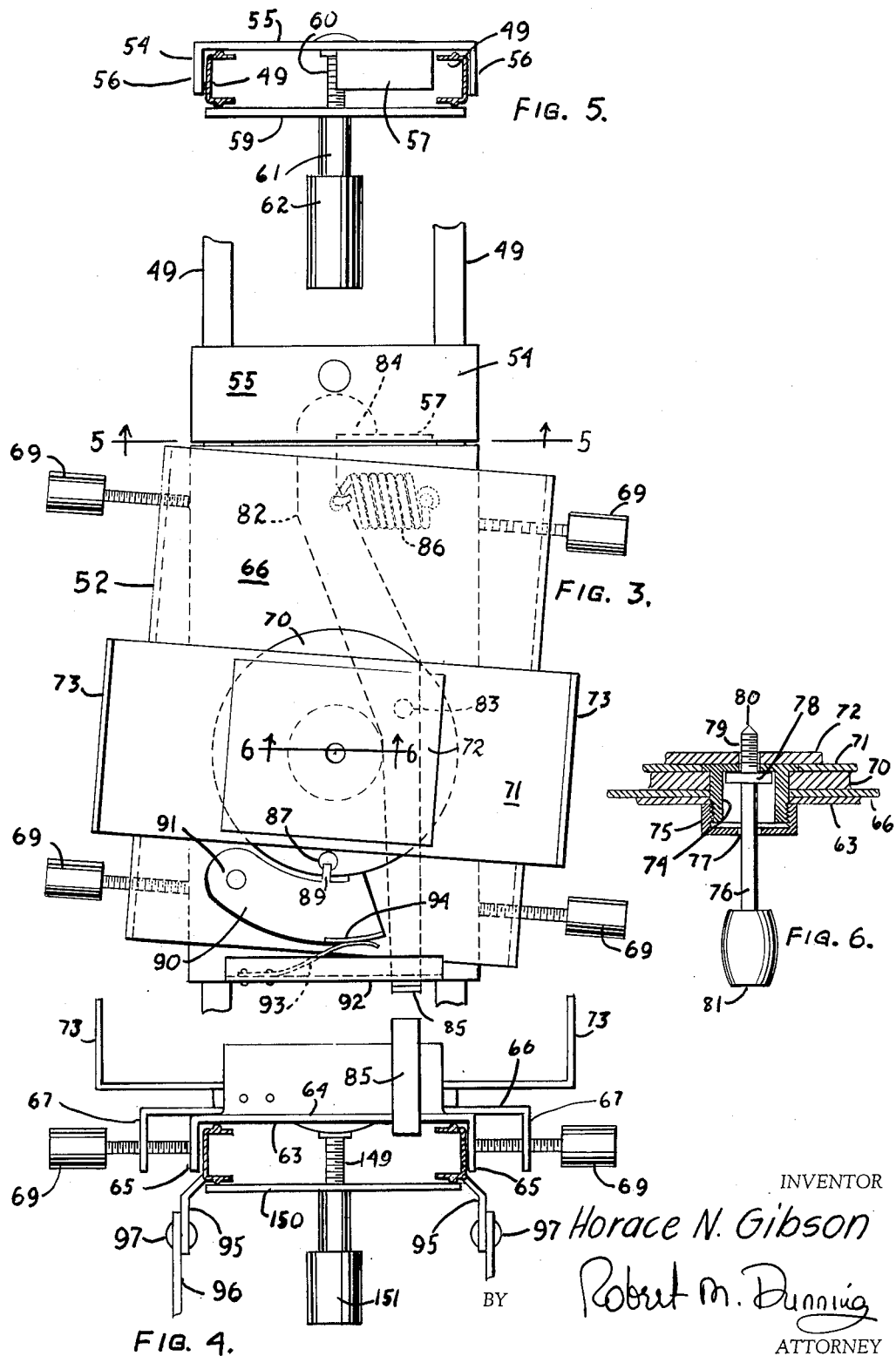
INVENTOR
Horace N. Gibson
BY Robert M. Dunning
ATTORNEY June 12, 1956 H. N. GIBSON 2,750,489
PHOTOGRAPHIC ILLUMINATING DEVICE
Filed Dec. 18, 1952 5 Sheets-Sheet 4
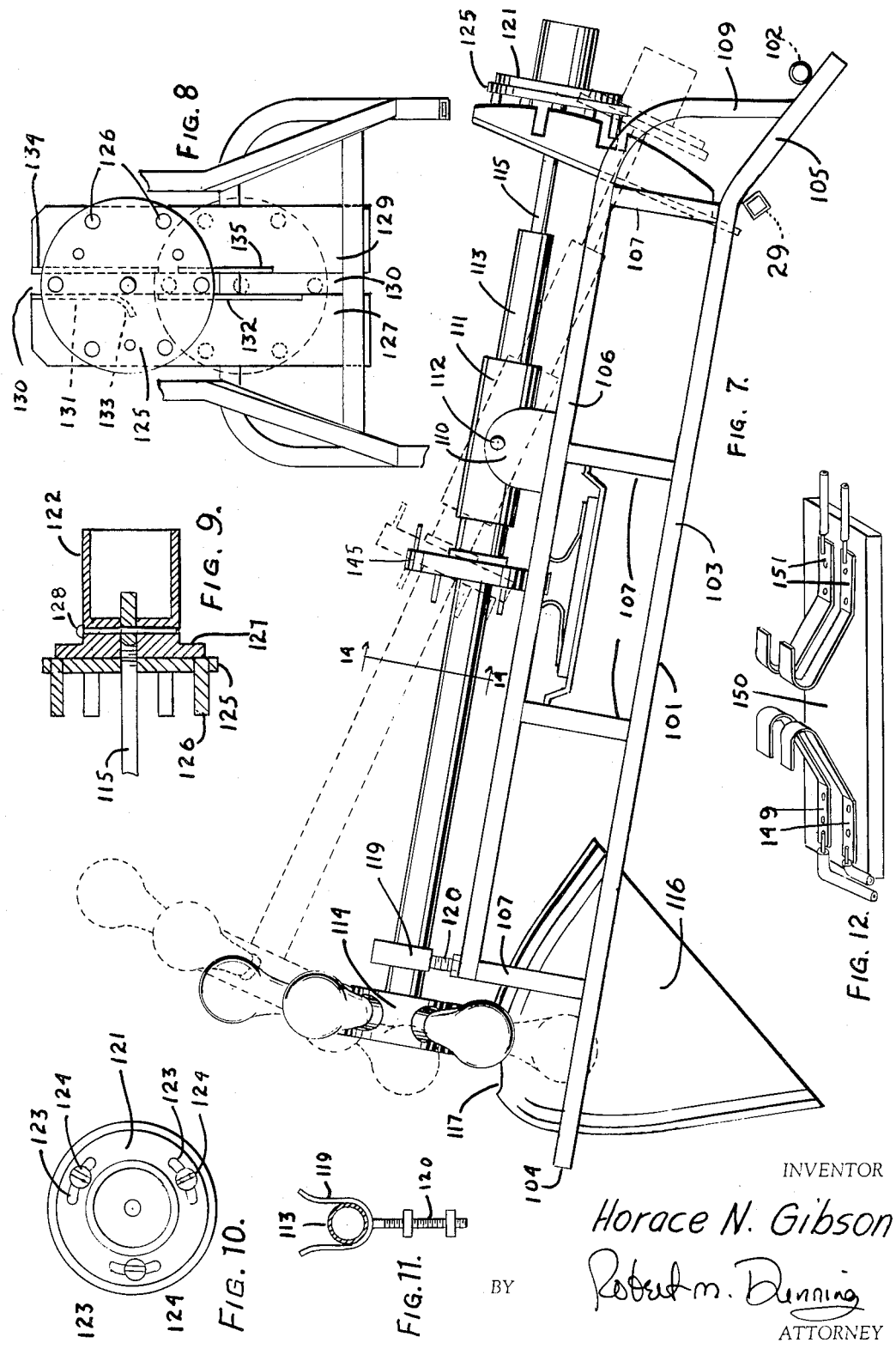
INVENTOR
Horace N. Gibson
BY Robert M. Dunning
ATTORNEY June 12, 1956  H. N. GIBSON  2,750,489
PHOTOGRAPHIC ILLUMINATING DEVICE
Filed Dec. 18, 1952  5 Sheets-Sheet 5

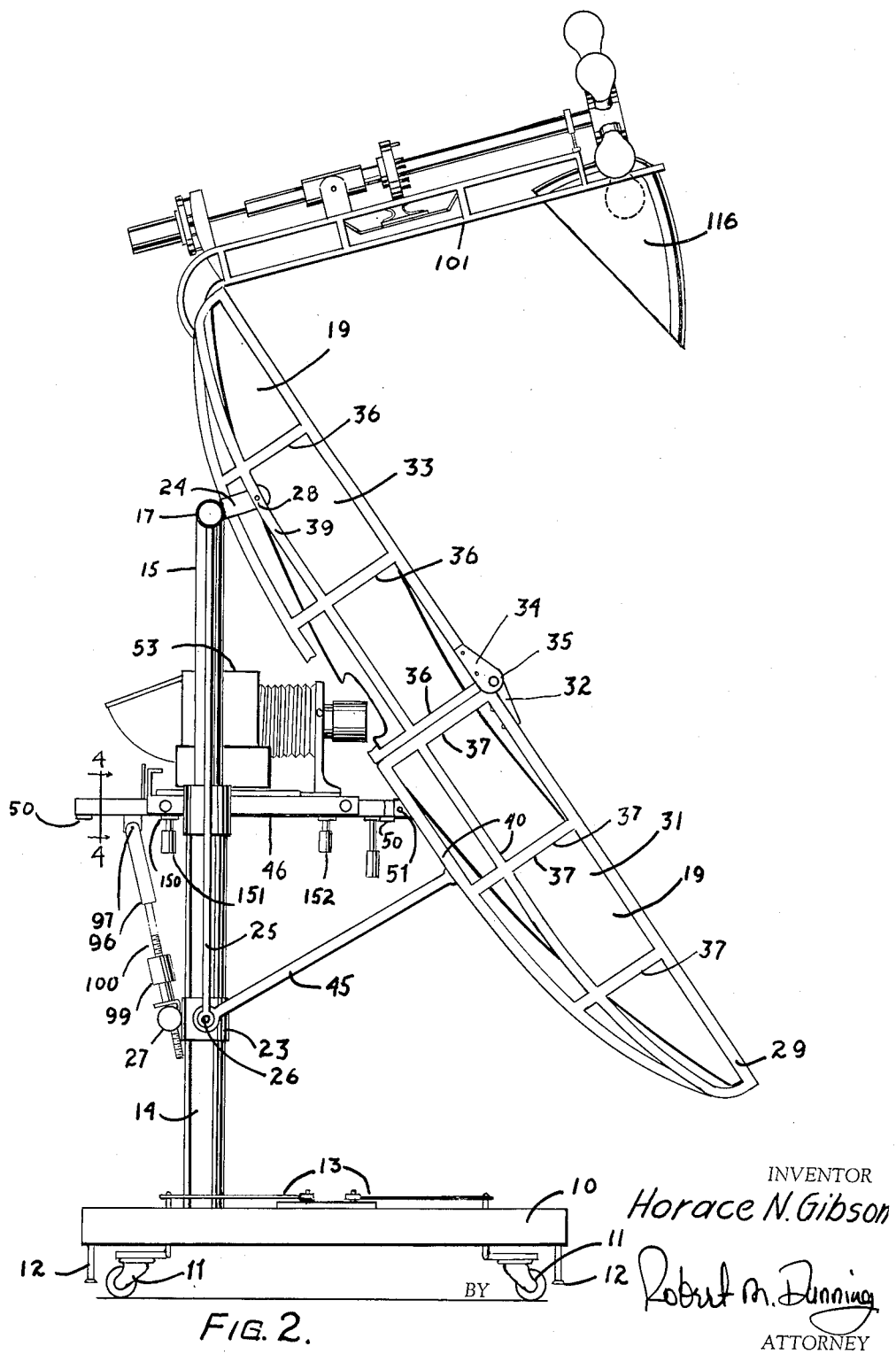

INVENTOR
Horace N. Gibson
BY Robert M. Dunning
ATTORNEY

United States Patent Office 2,750,489
Patented June 12, 1956

2,750,489

PHOTOGRAPHIC ILLUMINATING DEVICE

Horace N. Gibson, St. Paul, Minn.

Application December 18, 1952, Serial No. 326,637

20 Claims. (Cl. 240—1.3)

This invention relates to an improvement in light reflectors and deals particularly with a reflector designed for use in conjunction with photography.

Various types of reflectors have been employed for directing light upon a subject to be photographed. In most instances these reflectors are so positioned as to cast a visible shadow on one side or the other of an image which is visible at the point of location of the camera lens. A feature of the present invention resides in the provision of a reflector which will direct light rays toward a common focal point at a distance from the reflector. By placing the subject to be photographed at or forwardly of this common focal point and by locating the camera lens near the center point of the reflector, a picture may be taken in which no shadows are visible, all of the shadows being behind the subject with respect to the camera lens.

A feature of the present invention resides in the provision of a light reflector which is readily movable and which may be carried from point to point when necessary. The device is collapsible and foldable so that it requires a minimum of space and may be transported with comparative ease.

A further feature of the present invention lies in the provision of a reflector of relatively large size which can be easily handled and adjusted to direct light in the proper direction. Adjusting means are provided for properly positioning the camera relative to the reflector so that a minimum of effort is required to take the picture.

A further feature of the present invention lies in the provision of a reflector for a light source and in providing a means of changing the light source so that a continuously burning light may be positioned at the light source for focusing purposes and a flash bulb may be located at the light source when the picture is actually taken. Means are provided whereby the lights may be easily changed so that either type of light may be positioned at the light source.

An added feature of the present invention lies in the provision of a light source having a camera support associated therewith and in so mounting the camera that it may be adjusted for taking the picture and may be moved from proper position and returned to this position with a minimum of difficulty. Means are provided for supporting the camera so that it may be moved into and out of the proper position to take the picture without changing the angle at which the camera is directed.

These and other objects and novel features of the present invention will be more clearly and fully set forth in the following specification and claims.

In the drawings forming a part of the specification:

Figure 2 is a side elevational view of the reflector, a portion of the reflector frame being broken away to show the camera lens position.

Figure 3 is a top plan view of the camera support.

Figure 4 is a sectional view through a portion of the camera support, the position of the section being indicated by the line 4—4 of Figure 2.

Figure 5 is a sectional view through the camera support, the position of the section being indicated by the line 5—5 of Figure 3.

Figure 6 is a sectional view through a center portion of the camera support.

Figure 7 is a side elevational view of the light support used in conjunction with the reflector.

Figure 8 is an end elevational view of the camera support shown in Figure 7.

Figure 9 is a sectional detail through a portion of the light positioning mechanism.

Figure 10 is an end view of a portion of the light positioning mechanism.

Figure 11 is a detail view of a yoke forming a part of the support of the light positioning mechanism.

Figure 12 is a perspective view of the switch used in conjunction with the light positioning mechanism.

Figure 1:
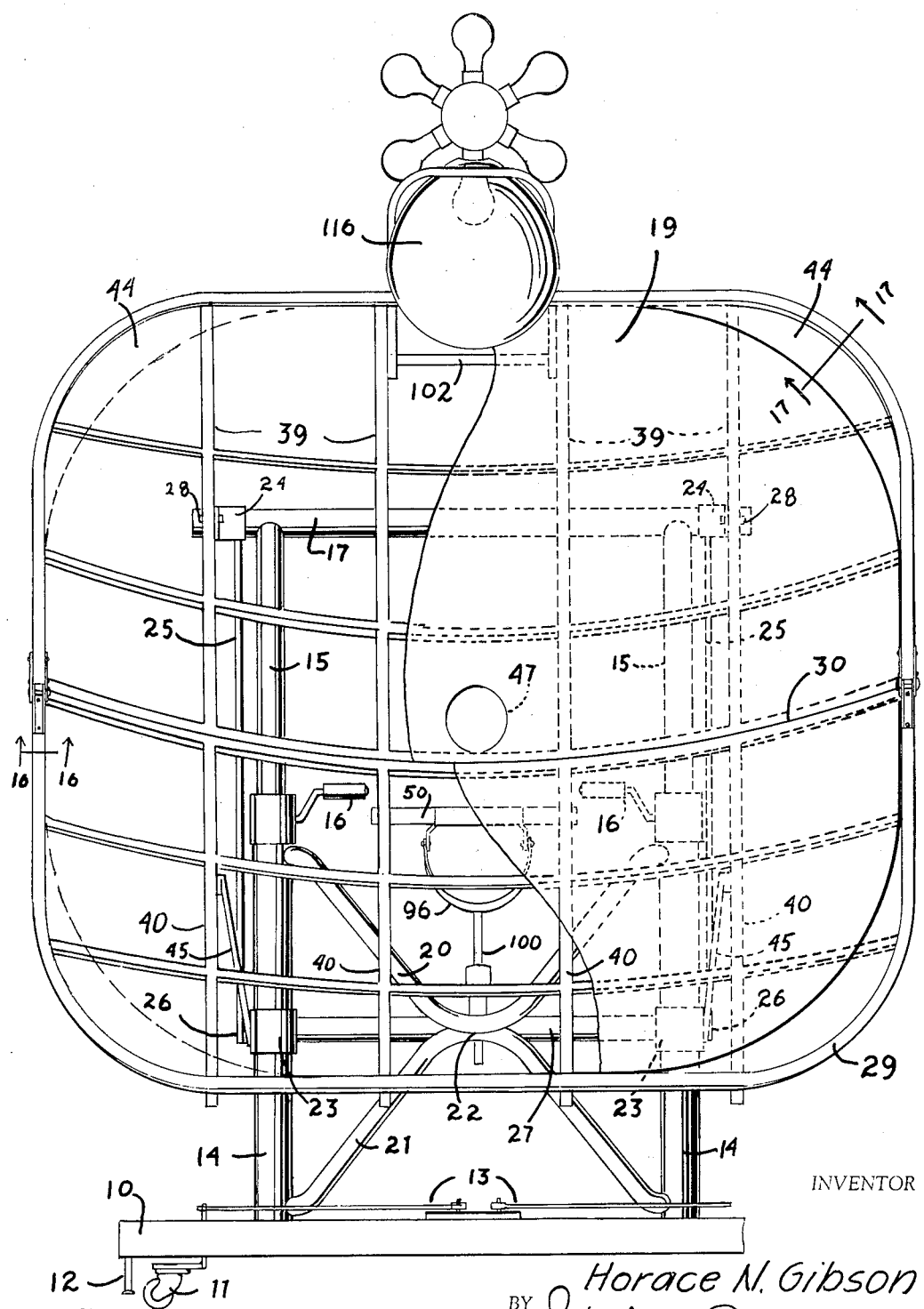
Figure 1 is a front elevational view of the reflector, a portion of the reflector body being broken away to show the supporting construction.

The reflector is shown in general in Figures 1 and 2 of the drawings. In these figures I disclosed a base 10 which is normally supported by casters 11 so that it may be moved about the surface of the floor. Means 12, not illustrated in detail in the drawings, are provided for engaging the surface of the ground when the casters 11 are moved out of engagement therewith. Caster pivoting means 13 are provided which are not shown in detail in the drawings. The purpose of the arrangement is to provide a means of holding the reflector stationary when it is so desired.

A pair of standards 14 extend upwardly from the base 10 in parallel spaced relation. A pair of frame members 15 are slidably supported by the upper ends of the standards 14 and telescope into the standards 14. The standard members 15 are provided with rack teeth thereupon not illustrated in the drawing, but which are cooperable with pinions rotatable through the use of crank handles 16. By rotating the crank handles 16 the standard members 15 may be telescoped to a greater or lesser degree into their respective standards 14. The standard members 15 are connected at their upper extremity by a cross connecting member 17. This cross connecting member forms a support against which the reflector 19 may engage.

A generally U-shaped supporting brace 20 connects the standards 14 near the upper extremities thereof, the U-shaped center portion of the brace extending downwardly toward the base 10. An inverted U-shaped brace 21 is secured at its ends to the lower ends of the standard 14. The center portions of the U-shaped braces are connected together at 22 to form a rigid support between the standards.

A pair of sleeves 23 are slidably supported upon the standards 14. A pair of brackets with forwardly projecting arms 24 support the reflector 19 by means of bolts 28 which engage in suitable drilled aperture in vertical braces 39 of the reflector. A link 25 screws into a threaded aperture in cross member 17 and is secured at the lower extremity at 26 to sleeve 23. Thus as the standard portions 15 are moved vertically relative to the standards 14, the sleeves 23 are moved upwardly and downwardly on the standards 14. A cross brace 27 connects the sleeves 23 rearwardly of the standards as shown in Figure 2 of the drawings. This cross member 27 assists in forming a support for the camera as will be later described in detail.

The reflector 19 is enclosed within a marginal frame 29, the reflector and frame being divided intermediate its upper and lower edges along a parting line 30. As shown in Figures 1 and 2, the lower section 31 of the reflector 19 is provided with a hinge portion 32 and the upper reflector section 33 is likewise provided with a hinge section 34, the two sections being hingedly connected at 35. A series of spaced braces 36 extend transversely between the frame sides of the upper section 33 and a similar series of spaced frame members 37 extend transversely across the lower frame section 31. Spaced upwardly and downwardly extending braces 39 are provided in the upper reflector section 33 and similar upwardly and downwardly extending frame braces such as 40 are provided in the lower reflector section 31. These braces form a network of crossed braces which form a support for the reflector surface.

Figure 16:
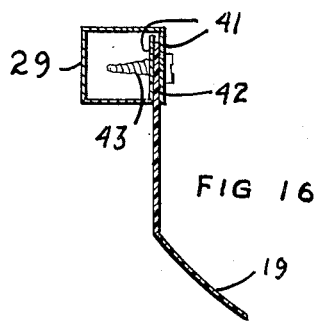
Figure 16 is a sectional view through the reflector supporting frame, the position of the section being indicated by the line 16—16 of Figure 1.
Figure 17:
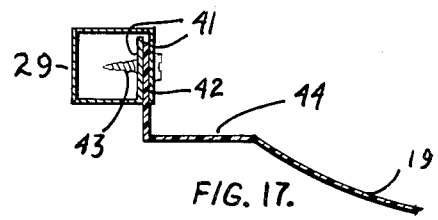
Figure 17 is a sectional view on the line 17—17 of Figure 1.

As indicated in Figures 16 and 17 of the drawings, the marginal frame 29 encircling the reflector is generally rectangular in form having a pair of spaced flanges 41 along the outer surface thereof parallel with the front of the reflector. The marginal edge 42 of the reflector 19 is preferably engaged between the flanges 41 and the flanges are then clamped together by metal screws 43 or other suitable means.

The reflector 19 is provided with a surface which is designed to reflect light from a common light source to a common focal point. Every point on the surface of the reflector 19 is so located that the distance from the focal point to the reflector surface and from this point of the reflector surface to the center of the light source is equal. In other words, the sum of the distance from the focal point to any point on the reflector surface and from this point on the reflector surface to the center of the light source is a constant. As a result the light beams converge toward the common focal point and the light casts no shadow which is visible from the center of the reflector. For example and for the purpose of illustration, let it be assumed that the reflector is 4' x 5' in edge dimensions. This makes twenty square feet of surface or 2,880 square inches of reflective surface which, for the purposes as herein described, no two square inches are exactly in the same plane. Now, with the 2,880 separate inch squares of reflective material smoothed into a well rounded concave reflector and with the source of light outside the reflector directed so as completely cover the entire reflector, all the rays striking the reflector are in turn bounced inwardly and converge on the point of focus, as described.

In order that the reflector fit the marginal frame 29 and in order to provide a marginal frame which is on a common plane, the reflector extends rearwardly from the sides of the marginal frame as indicated in the cross section shown in Figure 16. At the corners of the reflector relatively narrow flat areas 44 are provided which are not designed to serve as reflective surfaces. These frame areas are indicated in Figure 17 of the drawings, as well as in Figure 1.

A pair of braces 45 are connected to the sleeves 23 and extend forwardly and upwardly therefrom, these braces being connected at their forward ends to certain of the upwardly and downwardly extending frame braces 40 of the lower reflector section 31. As a result the reflector moves upwardly and downwardly with the standard members 15 and the sleeves 23. Rearwardly of the reflector 19 I provide a camera support indicated in general by the numeral 46. An opening 47 is provided in the center of the reflector 19 or near the center thereof, through which the end of the camera may extend.

With reference now to Figure 3 of the drawings, it will be noted that the camera support includes a pair of spaced channel shaped rails 49 which are connected at their extremities by cross members such as 50. The forward ends of the rails are pivotally connected as at 51 to the lower reflector section 31. The rails 49 support a movable carriage 52 which actually supports the camera 53 and also supports a movable bracket 54, best shown in Figures 3 and 5. The bracket 54 includes a top plate 55 having downwardly extending flanges 56 at each side thereof. A downwardly extending ear 57 is provided along one edge of the top plate 55. A clamping plate 59 underlies the rails 49. A machine screw 60 extends downwardly from the top plate 55 and extends into the internally threaded socket 61 provided with an adjustment handle 62. By threading the sleeve 61 against the undersurface of the plate 59, this plate may be clamped against the lower surfaces of the rails 49 and may clamp the plate 55 against the upper surfaces thereof, thus holding the bracket 54 in an adjusted position.

The carriage 52 includes an inverted channel shaped base portion 63 having a flat plate 64 and downwardly extending spaced side flanges 65. Overlying the channel member 63 I provide an inverted channel shaped member 66 which is shaped similarly to the member 63, but is somewhat wider. The side flanges 67 of the channel member 66 thus lie outwardly of the flanges 65 of the channel member 63 so as to permit some relative angularity between the two channel shaped members. Set screws 69 are threaded through the flanges 67 and may engage against the flanges 65 for holding the channel member 66 in an adjusted relation relative to the channel shaped member 63.

The disc 70 is bolted to channel member 71 and to plate 72. Channel 71 has two upturned flanges 73 which act as two handles during the rotation movement of the camera. Plate 72 is designed to raise the camera off channel 71 to prevent the rubber legs often found on the bottom of cameras from interference with a tight adjustment of camea to mechanism. Rotation is permitted by means of rotation axle 74 which rotatably connects all members together, and extends through apertures in channels 71, disc 70, channels 66 and 63. Tightening nut 75 permits an easy taking up of any looseness in the mechanism.

A rod 76 extends through an aperture 77 in the tightening nut 75 and is provided with a shoulder or enlargement 78 which permits a tightening effect between adjustment mechanism and the camera itself as is customary in camera tripods. The rod 76 is provided with a threaded upper extremity 79 designed to extend through aligned apertures in the camera supporting plate 72 and channel 71. Threaded member 80 is designed to engage into a suitable threaded socket in the base of the camera to hold the camera in place thereupon. An enlargement 81 is provided on the lower end of the rod 76 to simplify the rotation thereof.

A lever 82 is pivotally secured to the undersurface of the channel member 63 at 83. The lever 82 is provided with a hook end 84 designed to engage the downturned ear 57 on the bracket 54. The lever is provided with an up-turned extremity 85 by means of which the lever may be pivoted about its axis 83. A spring 86 normally biases the lever 82 into locking engagement with the ear 57.

The rotatable disc 70 is rotatable in unison with the camera base plate 72 and channel 71. This disc is provided with a notch 87 in its periphery designed to be engaged by a latch projection 89 mounted upon a pivoted latch 90 pivotally secured to the channel member 66 at 91. A flange 92 extends upwardly from the rear edge of the channel member 63. A spring 93 is secured to the flange 92 and is designed to engage against an upwardly extending ear 94 on the latch member 90. By engaging the flange 94 with the fingers and pivoting the latch member 90 in a clockwise direction about its pivot 91, the latch projection 89 may be disengaged from the slot 87, allowing the disc 70 to rotate about its axis. When the camera 53 is supported upon the camera base plate 72, the camera will also be rotated out of its normal position when it is desired to adjust the camera or change the filters or lenses thereupon.

A pair of ears 95 project downwardly from the channel rails 49 near the rear extremity thereof. A yoke 96 (see Figures 1 and 2) is pivotally secured along aligned pivots 97 to the ears 95. A stop nut 99 is threaded upon a threaded shaft 100 secured to the base of the yoke 96. By adjusting this nut 99, the elevation of the rear end of the camera supporting rails 49 may be regulated. In other words, if the camera is to be tilted slightly upwardly or downwardly, this may be accomplished by operation of the nut 99.

A light support 101 is secured to the upper extremity of the upper reflector section 33 to extend therefrom in cantilever fashion. As indicated diagrammatically in Figure 7 of the drawings the light support 101 extends over the marginal reflector frame edge 29 and under a cross brace 102 on the upper reflector section to extend forwardly from the upper edge of the reflector. The light support may be easily removed by disengaging the projecting ends thereof in the obvious manner.

The light support includes a pair of generally parallel arms 103 which are looped together at their forward ends 104. These arms 103 are bent downwardly at a somewhat greater angle at their rear ends 105 so as to extend beneath the cross brace 102.

The light support also includes an additional pair of parallel spaced arms 106 which are generally parallel to the arms 103 and which are suspended in spaced relation thereto by inverted U-shaped cross braces 107. The ends of the arms 106 are bent downwardly at 109 to be secured to the extremities 105 of the arms 103.

A yoke 110 is supported upon the arms 106. A sleeve 111 is pivotally supported at 112 between the sides of the yoke 110. An elongated sleeve 113 is rotatably supported within the sleeve 111 and supports at its forward extremity a disc-shaped body 114 of insulation material. A rod 115 is supported within the sleeve 113 and is secured for rotation in unison therewith. This rod 115 projects rearwardly from the sleeve 113 and is provided with a stop (not shown) which prevents downward motion beyond the position shown by dotted lines in Figure 8.

A reflector 116 is mounted between the arms 103 near the looped end 104 thereof. This reflector is provided with an opening 117 in the upper end thereof for accommodating a light bulb. A U-shaped yoke 119 is adjustably supported by a threaded adjustment stud 120 on a cross member between the arms 106, this yoke limiting the pivotal movement of the sleeve 111 relative to its supporting yoke 110.

With reference to Figure 9 of the drawings, it will be noted that I have provided a disc 121 on the operating handle 122 which is pinned to the rod 115 by means of pin 128. As shown in Fig. 10 the disc 121 is provided with a series of angularly spaced slots 123 therein to hold a series of clamping bolts 124. The bolts 124 extend into a disc 125 on the rod 115. A series of six angularly spaced pins 126 are mounted upon the disc 125 in equally spaced relation. These pins are designed to hold the rod 115 and the sleeve 113 connected thereto in proper angular relation.

As shown in Figures 7 and 8 of the drawings, a pair of guide plates 127 and 129 are secured to the light support to extend upwardly and rearwardly therefrom. These plates are supported in spaced relation to provide a slot 130 therebetween. Two spaced flanges 131 and 132 are provided on the plate 127 adjacent the slot 130, the upper flange 131 having a flaring lower end 133. A pair of spaced flanges 134 and 135 are provided on the plate 129 adjacent to the slot 130.

These flanges are arranged so as to hold two of the pins 126 of the disc 125 in vertical alignment. Normally the vertically aligned pins on the disc 125 are supported between the flanges 131 and 134 and between the flanges 132 and 135 respectively. In actual practice the flanges may be continuous as shown in Figure 7 and the flanges notched instead of completely separated. When the sleeve 113 is in the position shown in full lines in Figure 7 of the drawings, two vertically aligned pins are between the spaced flanges and thus hold the sleeve from rotation.

When the sleeve 113 is tilted downwardly into the position shown in dotted outline in Figures 7 and 8, the disc 125 and the entire sleeve 113 and rod 115 may be rotated in a clockwise direction as viewed in Figure 8 until virtually sixty degrees of rotation has taken place. At this time the uppermost pin of the pair strikes against the flange 132, preventing further rotative movement. However, if the sleeve 113 is then tilted toward the full line position shown in these figures, the curved lower edge 133 of the flange 131 will cam the uppermost pin into vertical alignment with the lowermost pin, completing the one-sixth rotation of the sleeve.

Figure 13:
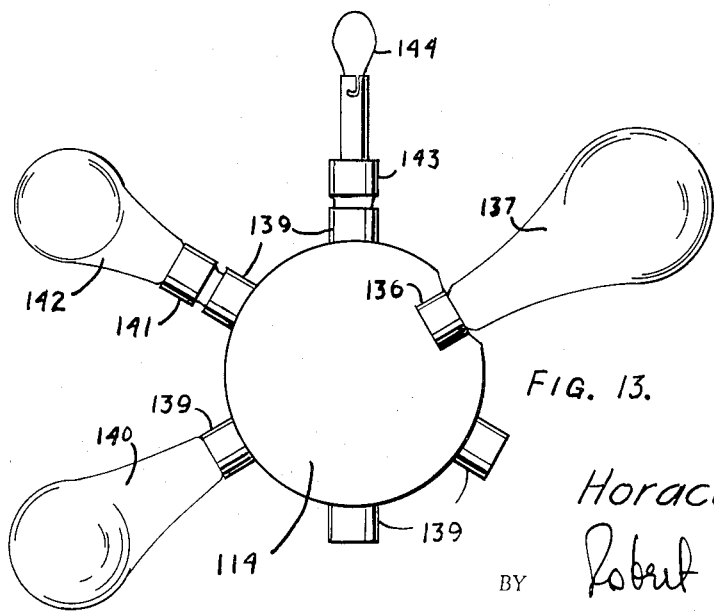
Figure 13 is an end view of the light support.

As shown in Figure 13 of the drawings the insulation disc 114 is provided with six sockets in angularly spaced relation. One of these sockets 136 is recessed into the disc and is designed to support a continuously operable light bulb 137. The remaining sockets may be of similar shape and design and may be arranged to support flash bulbs. The sockets 139 are all designed to fit the larger sizes of flash bulbs 140 shown opposite the bulb 137. By use of a suitable adapter 141 the sockets 139 may be made to fit a somewhat smaller type flash bulb 142. Furthermore, by use of a different type of adapter 143, the sockets 139 may be made to accommodate the smallest type flash bulb 144 which are usually of the bayonet type. While Figure 13 shows various styles of flash bulbs, usually all of the flash bulbs mounted at one time are of a generally similar type.

Figure 14:
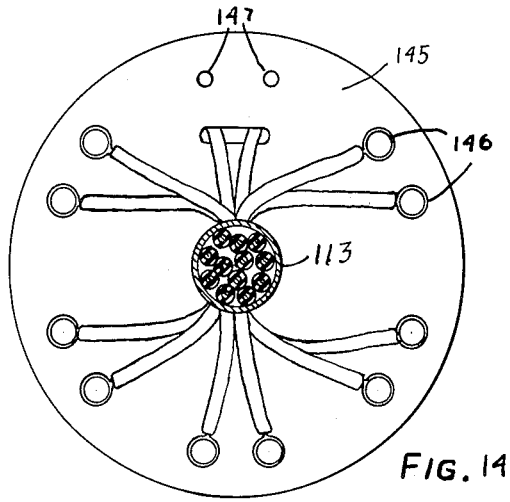
Figure 14 is a sectional view on the line 14—14 of Figure 7.
Figure 15:
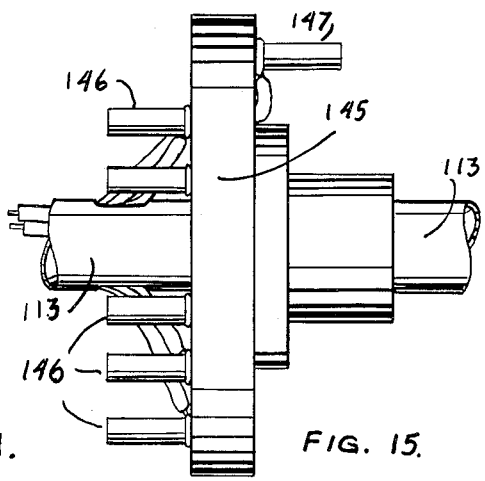
Figure 15 is a detail side elevation view of the contact member shown in Figure 14.

An insulation disc 145 is mounted upon the sleeve 113 to rotate in unison therewith. Figures 14 and 15 show front and side views of this disc 145. As shown in Figure 15, a series of pins 146 project from the forward surface of the disc 145, these pins being arranged in angularly spaced pairs. A single pair of pins 147 project from the rear side of the disc 145. Conductors extend from all of the pins to corresponding bulbs at the forward end of the sleeve 113. The pins 147 are connected to the two terminals of the continuously burnable type of bulb 137, or at least to the socket 136 in which this bulb is supported. The remaining pairs of pins 146 are each connected by conductors to the socket terminals of a corresponding socket 139. The conductors may extend through the interior of the sleeve 113.

As illustrated in Figure 12 of the drawings, a pair of spaced contact blades 149 are supported upon an insulation base 150 near the disc 145. A second pair of contact blades 151 are arranged in opposed relation to the blades 149. The contact assembly is supported as shown in Figure 7 to the light support 101. The contact blades 149 are connected to a suitable source of current supply suitable for energizing the flash bulbs in the sockets 139. The contact blades 151 are connected to a suitable source of current capable of energizing the continuously burning light in the socket 136.

The pins upon the disc 145 are properly situated relative to the various light bulbs and relative to the pins 126 upon the disc 125 so that in each position of the sleeve 113 one of the bulbs is supported within the reflector 116 and the contacts of the corresponding socket are electrically connected to the contacts to supply the suitable current thereto. In other words, when the sleeve is rotated so that the continuously burning light 137 is in the reflector 116 the contact pins 147 are engaged with their cooperable contact blades 151 so that proper current may be supplied to illuminate this bulb. In any of the other relative angular positions of the sleeve 113, a pair of the pins 146 are electrically connected to the contact blades 149 so that the corresponding flash bulb may be connected to its proper source of current supply. Obviously a switch may be provided in the current supply to the continuously burnable light 137 and a synchronizing switch arrangement may be provided in the circuit to the corresponding flashbulbs so that these bulbs will receive current only when the camera shutter is actuated.

A part of the operation of the apparatus has been described in conjunction with the previous description. The reflector may be of any desired material such as plastic, plastic impregnated cloth, reflective metal, or the like. In using the reflector, the reflector is moved to the desired location and the continuous burning light is inserted in the reflector 116. The camera is attached to the camera mechanism and focused through aperture 47 in the reflector. The sleeve 113 is tilted downward and rotated to position a flash bulb in operative position within the reflector 116. When the camera is actuated to take the picture, the flash bulb is energized in the usual manner and the same illumination will result as when the continuously burning light was in use.

The operation may be repeated as often as desired, the flash bulbs being replaced when necessary. If it is desired to change the lens of the camera or a filter thereupon, or if it becomes necessary to reach some adjustment on the camera not ordinarily available the lever 82 may be pivoted and the carriage 52 slid rearwardly on the rails 49. If desired the latch 90 may be disengaged from the disc 70 and the camera rotated throughout at least a portion of a circle. When the disc is rotated to its original position the latch 90 will again engage and when the carriage 52 is urged forwardly the lever 82 will again engage the bracket ear 57 and thus the camera will be returned to its starting position.

Slight adjustments of the camera about a transverse horizontal axis may be made by use of the adjustment nut 99 which acts to tilt the rails 49 upwardly or downwardly. An ordinary side adjustment of relatively small amplitude may be accomplished with the set screws 69. Once the camera has been inserted in its proper place, it may be removed and returned to this position without impairing the adjustment.

When the carriage 52 is in its proper adjusted position, it can be secured in this position by means shown in Figures 2 and 4 of the drawings. A pair of spaced studs 149 project downwardly from the plate 64 in longitudinally spaced relation. These studs extend through clamping plates 150 as shown in Figure 4. Internally threaded sleeves 151 and 152 are placed on the studs 149 and may be tightened to clamp the plates 150 against the rails 65 to hold the carriage in place. These sleeves may be tightened by hand, and must be loosened before the carriage may be moved.

In accordance with the patent statutes, I have described the principles of construction and operation of my reflector, and while I have endeavored to set forth the best embodiment thereof, I desire to have it understood that this is only illustrative thereof and that obvious changes may be made within the scope of the following claims without departing from the spirit of my invention.

I claim:

1. A photographer's light reflector for reducing a subject's shadow with respect to a camera lens including in combination a body of light reflective material having an opening near the center thereof, a light source positioned out of the path of light rays from said reflector, said reflector directing all of the light rays toward a common focal point, the sum of the distance from the focal point to any point on the reflector and from this point on the reflector to the center of the light source being a constant, and camera supporting means for supporting a camera lens directed through said opening.

2. The construction described in claim 1 and in which the light source is supported above and forwardly of the reflector.

3. The construction described in claim 1 and including means supporting the reflector inclined forwardly and downwardly and in which the light source is positioned above and forwardly of the reflector.

4. A photographer's reflector for use in photography to illuminate and reduce the size of a subject's shadow including in combination a base, a pair of standards extending upwardly from said base, standard portions in telescoping relation with said standards, means slidably supported by said standards and connected to said standard portions for movement therewith, and a centrally apertured subject illuminating light reflector of relatively large size to reflect light from a common light source to a common focal point and carried by said last named means for said standard portions.

5. The structure described in claim 4 and including a camera support behind the aperture in said reflector and connected to said standard portions for movement therewith.

6. The structure described in claim 4 and including a source of light supply supported by said reflector in tilting and spaced relationship thereto and movable therewith.

7. An illuminating reflector device having a common focal point at some distance forwardly thereof for use in photography and the like to illuminate a subject with diminishing shadow, the device including in combination a reflector body, an auxiliary reflector mounted forwardly of said reflector body, said auxiliary reflector having an opening therethrough, a series of light bulbs supported in angularly spaced relation, with one of said light bulbs extending through said opening and within said auxiliary reflector, means rotatably supporting said light bulbs, and means tiltably supporting said light bulbs about an axis at right angles to the axis of rotation to withdraw the light bulb from said auxiliary reflector.

8. The structure described in claim 7 and including means for holding said light bulb support from rotation when a light bulb is extending through said opening.

9. A light source for use in conjunction with illuminating a subject with a diminishing shadow by the light of a reflector, the light source including in combination, a reflector having a camera opening therein, an auxiliary reflector having an opening therein, a rotatable support, a series of angularly spaced light bulbs supported on said support for rotation about the axis thereof, one of said light bulbs being extendable through said opening in said auxiliary reflector, means tiltably supporting said rotatable support about an axis at right angles to the axis of rotation, and means for holding said rotatable support from rotation in normal position of said rotatable support.

10. The structure described in claim 9 and including contact means and cooperable means on said rotatable support engageable with said contact means in normal position of said rotatable support.

11. A light source device for use in conjunction with photographing a subject without visible shadow from the light of a reflector, the device including in combination, a large reflector having a central opening therein and a common focal point, an auxiliary reflector having an opening therein, an elongated rotatable support, a series of angularly arranged light bulbs supported upon said elongated support for rotation about the axis thereof, one of said light bulbs being insertable through said opening, said opening being of insufficient size to permit rotation of said light bulbs when engaged in said opening, means tiltably supporting said rotatable support about an axis at right angles to the axis of rotation, means holding said elongated support from rotation when a light bulb thereupon is extending through said opening, said last named means permitting rotation of said elongated support when the same is tilted to remove the light bulb from said opening.

12. The construction described in claim 11 and including contacts and cooperable means on said rotatable member engageable with said contacts when a light bulb is extending through said opening.

13. In combination a light support for use in conjunction with a reflector directing light rays toward a common focal point at a distance from the reflector, the light support including in combination, a reflector having a common focal point, an elongated rotatable member, a series of light bulbs supported in angularly spaced relation on said elongated member, an auxiliary reflector having an opening therethrough through which a selected light bulb may extend forwardly of and in spaced relationship to each of said reflectors, means tiltably supporting said elongated member intermediate its ends, tiltable movement thereof withdrawing the light bulb from said opening, means holding said elongated member from rotation until said elongated member is tilted, said last named means releasing said rotatable member for rotation when said light bulbs are tilted out of said opening.

14. The structure described in claim 13 and including means for limiting rotation of said elongated member in tilted position thereof.

15. The structure described in claim 13 and including contact means supported adjacent said tiltable elongated means, and means on said elongated means engageable with said contacts in untilted position thereof.

16. A reflector for use in photography including a reflector body having a common focal point at a distance from the body, a light positioned forwardly of said reflector out of alignment of said focal point, said reflector body having an opening therethrough near the center thereof, a camera support rearwardly of said reflector designed to support a camera directed through said opening, said support including an elongated track, a carriage movably supported on said track, a turn table supported on said carriage, and means for selectively holding said carriage stationary on said track.

17. A reflector including a frame having a concave forward portion, a reflector of similar shape having a common focal point at some distance forwardly thereof supported by said frame, a standard including upper and lower telescoping parts, means connecting the upper portion of said reflector to the upper telescoping part, means slidable on the lower telescoping part and connected to the lower portion of said reflector, and means connecting said slidable means to said upper telescoping part to move therewith.

18. The structure described in claim 17 and in which the reflector is divided into hinged parts and includes an opening therethrough, supporting means on said standard, and a camera supported by said supporting means and directed through said opening.

19. The structure described in claim 17 and including a camera support hingedly connected at one end to said reflector, means adjustably connecting the other end of the camera support to the lower portion of the standard, a camera on said support, and said reflector having an opening through which the camera lens is directed.

20. The structure described in claim 17 and including a light source supported by said reflector and movable therewith.

References Cited in the file of this patent

UNITED STATES PATENTS

| | | |
|---|---|---|
| 1,409,574 | Rasmussen | Mar. 14, 1922 |
| 1,489,341 | Boyd et al. | Apr. 8, 1924 |
| 1,834,428 | Seitz | Dec. 1, 1931 |
| 2,032,515 | Troup | Mar. 3, 1931 |
| 2,290,793 | Alderman | July 21, 1942 |
| 2,325,569 | Hancock et al. | July 27, 1943 |
| 2,346,217 | Haybourne | Apr. 11, 1944 |
| 2,408,469 | Malloy | Oct. 1, 1946 |
| 2,596,376 | De Goeij | May 13, 1952 |
| 2,622,188 | Seeger | Dec. 16, 1952 |

FOREIGN PATENTS

| | | |
|---|---|---|
| 345,360 | Great Britain | Apr. 2, 1931 |